(12) United States Patent
Grendelmeier et al.

(10) Patent No.: US 6,338,557 B1
(45) Date of Patent: Jan. 15, 2002

(54) SPECTACLES WITH MAGNIFYING LENSES

(75) Inventors: Alexander Grendelmeier, Birkenweg 12, 4663 Aarburg (CH); Gertrud Grendelmeier, Aarburg (CH); Beat Grendelmeier, Aarburg (CH); Felix Grendelmeier, Aarburg (CH)

(73) Assignee: Alexander Grendelmeier, Aarburg (CH)

( * ) Notice: Subject to any disclaimer, the term of this patent is extended or adjusted under 35 U.S.C. 154(b) by 0 days.

(21) Appl. No.: 09/588,438

(22) Filed: Jun. 6, 2000

(30) Foreign Application Priority Data

Jun. 7, 1999 (EP) .............................. 99810500

(51) Int. Cl.$^7$ ................................. G02C 1/00
(52) U.S. Cl. ........................... 351/158; 351/57
(58) Field of Search ..................... 351/57, 146, 158

(56) References Cited

U.S. PATENT DOCUMENTS

| | | | |
|---|---|---|---|
| 4,429,959 A | 2/1984 | Walters | 351/158 |
| 4,834,525 A | * 5/1989 | Vansaghi | 351/158 |
| 5,090,796 A | * 2/1992 | Feinbloom | 351/158 |
| 5,129,717 A | 7/1992 | Feinbloom | 351/158 |
| 5,291,229 A | * 3/1994 | Feinbloom | 351/57 |
| 5,499,064 A | 3/1996 | Vansaghi | 351/158 |

FOREIGN PATENT DOCUMENTS

| | | |
|---|---|---|
| DE | 650682 | 9/1937 |
| DE | 1276363 | 8/1968 |
| DE | 4004248 A1 | 8/1990 |
| DE | 9303663 | 4/1993 |

* cited by examiner

Primary Examiner—Huy Mai
(74) Attorney, Agent, or Firm—Seed Intellectual Property Law Group PLLC

(57) ABSTRACT

Spectacles, comprising an eyeglass frame, in which at least one transparent element acting as a glass can be inserted, and at least one holding means in which a magnifying lens can be disposed in each case, wherein the at least one holding means comprises a slot-shaped aperture made in the transparent element, which aperture has a longitudinal axis that is aligned substantially parallel to the imaginary line of spacing between the pupils of the eyeglass wearer, and in which slot-shaped aperture the magnifying lens is inserted and is displaceable in longitudinal axial direction of this slot-shaped aperture, and wherein a clamping device is provided with which the magnifying lens can be held, clamped, in adjusted position in the slot-shaped aperture of the transparent element. In this way the spacing between the two magnifying lenses of the spectacles can be aligned to the interpupillary spacing of the eyeglass wearer and can be fixed.

9 Claims, 4 Drawing Sheets

SPECTACLES WITH MAGNIFYING LENSES

BACKGROUND OF THE INVENTION

The present invention relates to spectacles, and more specifically to spectacles comprising an eyeglass frame in which at least one transparent element acting as a glass can be inserted, and at least one holding means in which a magnifying lens can be disposed in each case.

Spectacles of this kind, preferably provided with two magnifying lenses, are worn in particular by persons carrying out tasks in a field of activity requiring magnification. Such activities are performed in particular in fields of medicine, fine mechanics and electronics. These magnifying lenses are designed as objectives which are fixed to a pair of spectacles by means of a holding device.

One known design shows spectacles of this kind on whose eyeglass frame a bearing mechanism is mounted having a bearing arm, running transversely, on the ends of which the magnifying lenses are fixed so that they come to be situated in front of the pupil of the respective eye of the wearer.

These devices are complicated and impede a clear view, owing to the necessary bearing elements located in the field of vision of the wearer. To adjust the magnifying lenses, mechanisms are needed that are costly to manufacture and time-consuming to operate.

Spectacles are also known in which the magnifying lens systems, disposed in objectives, are stuck on the eyeglass lenses. Compared to the devices mentioned above, the result is that the vision of the wearer of these spectacles is no longer restricted by additional bearing elements. Disadvantageous, however, is that the affixing of the objectives containing the magnifying lens systems must take place individually for each wearer of spectacles of this kind since the interpupillary spacing varies from person to person. Therefore manufacture must be carried out individually for each wearer, which is very costly.

With these prior art spectacles with magnifying lenses, both spectacles having non-prescription lenses and those with prescription lenses can be used. In the case of both aforementioned prior art types of spectacles with magnifying lenses, these magnifying lenses can be aligned in such a way that the magnifying lens axes intersect at a distance from the eyes corresponding to the distance of the field of activity from the eyes.

OBJECTS OF THE INVENTION AND SUMMARY

The object of the invention consists in designing spectacles with magnifying lenses in such a way that the mutual spacing of the magnifying lenses can be easily adapted in each case to the interpupillary spacing of the respective wearer, and the magnifying lenses can be exchanged in a simple way.

This object is achieved according to the invention in that the at least one holding element comprises a slot-shaped aperture made in the transparent element, which aperture has a longitudinal axis that is aligned substantially parallel to the imaginary line of spacing between the pupils of the eyeglass wearer, and in which slot-shaped aperture the magnifying lens is inserted and is displaceable in the longitudinal axial direction of this slot-shaped aperture, and wherein a clamping device is provided with which the magnifying lens can be held, clamped, in adjusted position in the slot-shaped aperture of the transparent element.

With this solution according to the invention the magnifying lens spacing can be adjusted to the interpupillary spacing of the wearer of these spectacles. The length of the slot-shaped aperture can be selected in such a way that practically the entire range is covered within which interpupillary spacing values vary. It is also conceivable that the disposition and the length of the slot-shaped apertures are designed in such a way that a first type is foreseen for wearers having a small interpupillary spacing, a second type for wearers with an intermediate interpupillary spacing, and a third type for wearers with a large interpupillary spacing.

The clamping device is preferably formed by a flange and a threaded part, whereby, in the state of being placed on the transparent element, the flange is supported on the one side of the transparent element, and the threaded part projects through the slot-shaped aperture. A nut can then be screwed onto the threaded part, which nut is supported on the other side of the transparent element, whereby the flange can be pressed against the transparent element, and thus a clamp mounting achieved. This embodiment is easy to manufacture and operate.

The flange and the threaded part are preferably designed as a first sleeve-shaped element provided with a continuous bore in which the magnifying lens is insertable. In this way the magnifying lens can be easily exchanged, in particular if the magnifying lens is inserted in the bore and held by friction.

Another preferred embodiment of the invention consists in that insertable coaxially in said first sleeve-shaped element is a further sleeve-shaped element which is rotatable about a rotational axis, and provided in the further sleeve-shaped element is a further continuous bore, in which the magnifying lens is inserted, the axis of the bore being inclined by an angle a with respect to the rotational axis. The magnifying lens can have the shape of a cylinder whose axis coincides with the magnifying lens axis, making possible the use of simple magnifying glasses. Adjustment of the magnifying lens axis can take place by rotating the further sleeve-shaped element with respect to the first sleeve-shaped element.

A rotational mechanism can be provided to simplify this rotation of the further sleeve-shaped element with respect to the first sleeve-shaped element, and to make it more precise. At the same time a stop device can be provided, making possible a stopping of the rotation.

The magnifying lens is preferably displaceable in the direction of its longitudinal axis with respect to the transparent element. The distance of the magnifying lens from the eye can thereby be optimally adjusted.

The slot-shaped apertures for receiving the magnifying lenses can be made in two eyeglass lenses mounted on the eyeglass frame. However, they can also be provided on a protective shield that can be placed on the eyeglass frame. The protective shield, provided with magnifying lenses, can be placed on an eyeglass frame having no additional eyeglass lenses, or it can be placed on an eyeglass frame in which eyeglass lenses have already been inserted. The protective shield, with the magnifying lenses inserted therein, then comes to be situated in front of these eyeglass lenses. When the magnifying lenses are not being used, the protective shield with the magnifying lenses can thus be removed from this eyeglass frame provided with eyeglass lenses. The wearer is then wearing a normal pair of eyeglasses, it being possible for the eyeglass lenses to be prescription lenses.

Embodiments of the present invention will be explained more closely in the following, by way of example, with reference to the attached drawing.

DETAILED DESCRIPTION OF THE PREFERRED EMBODIMENTS

Figure 1:
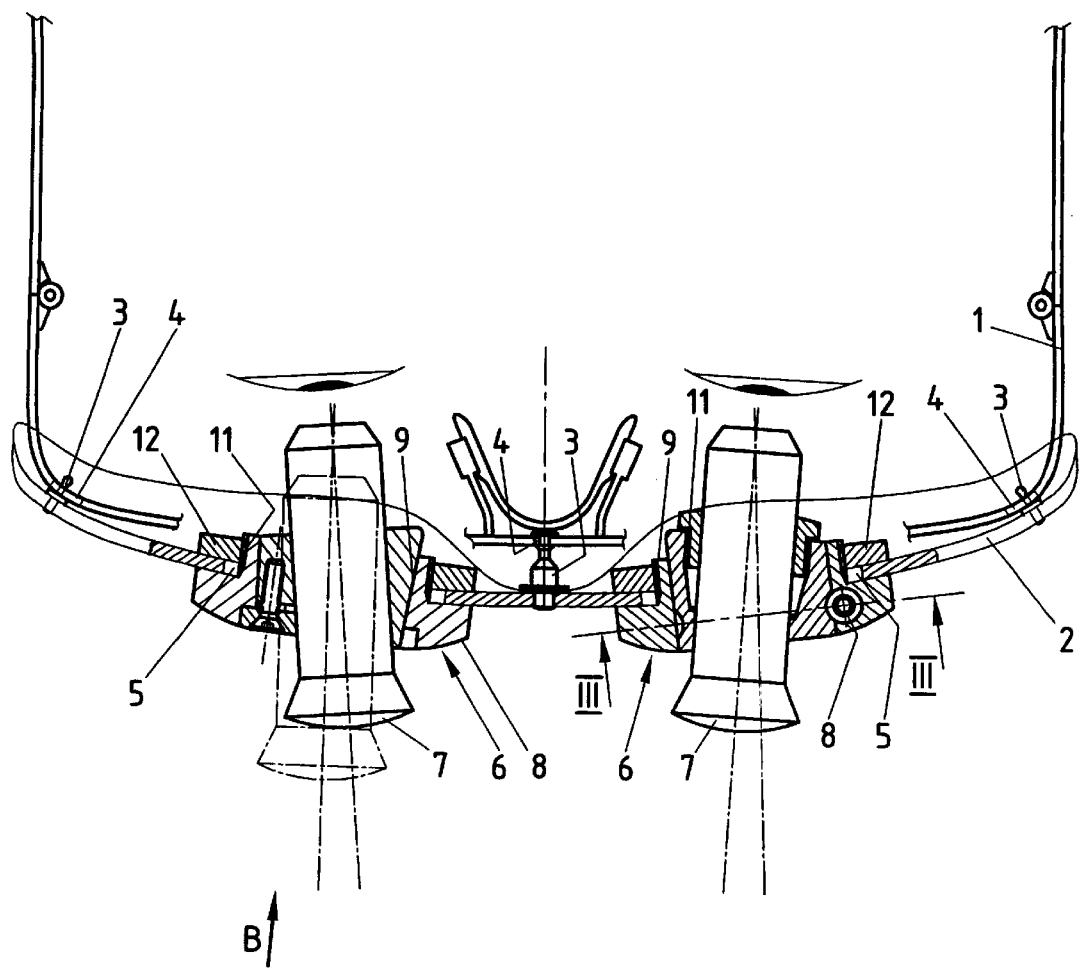
FIG. 1 shows a view from above of an eyeglass frame with placed-on protective shield and magnifying lenses held in this protective shield, a first embodiment of a holding means being shown on the left side and a second embodiment of a holding means being shown on the right side, both in section.

Shown in FIG. 1 is an eyeglass frame 1 in which a transparent element has been inserted, designed as protective shield 2. This protective shield 2 can be attached in a simple and known way to the eyeglass frame 1, three pins 3 being provided for this purpose, fastened to the protective shield 2, which are held in corresponding holes 4 in the eyeglass frame. With this attachment device, the protective shield 2 is connected to the eyeglass frame 1 in a predetermined position, practically free of play.

Provided on the protective shield 2 in the region of the eyes of the wearer of these spectacles are two slot-shaped apertures 5, going through the protective shield 2. Inserted into each of these slot-shaped apertures 5 is a holding means 6, bearing in each case a magnifying lens 7.

Both holding means 6 comprise a first sleeve-shaped element 8, which is provided with a continuous bore 9. Each first sleeve-shaped element has a flange followed by a threaded part 11. The first sleeve-shaped element 8 is inserted into the slot-shaped aperture 5, the flange 10 being supported on the outer surface of the protective shield 2. Screwed onto the threaded part 11 is a nut 12, which is supported on the inner surface of the protective shield 2.

These two holding means 6 are shown enlarged in FIGS. 4 and 5, and will be described in more detail with reference to these figures. As already mentioned, the first sleeve-shaped element 8 is held in the protective shield 2 clamped by means of flange 10 and nut 12 screwed onto the threaded part 11. The surfaces of flange 10 and nut 12 which are supported on the transparent element are preferably adapted to the curvature of this element. It would also be conceivable to provide corresponding intermediate shims.

Inserted in the bore 9 of the first sleeve-shaped element 8 is a further sleeve-shaped element 13. This further sleeve-shaped element 13 is held rotatable about a rotational axis 14. This further sleeve-shaped element 13 is provided with a further continuous bore 15, the axis of which is inclined with respect to the rotational axis 14 by an angle α. Inserted in this further bore 15 is the magnifying lens 7, the magnifying lens axis coinciding with the axis 16 of the further bore 15.

Figure 4:
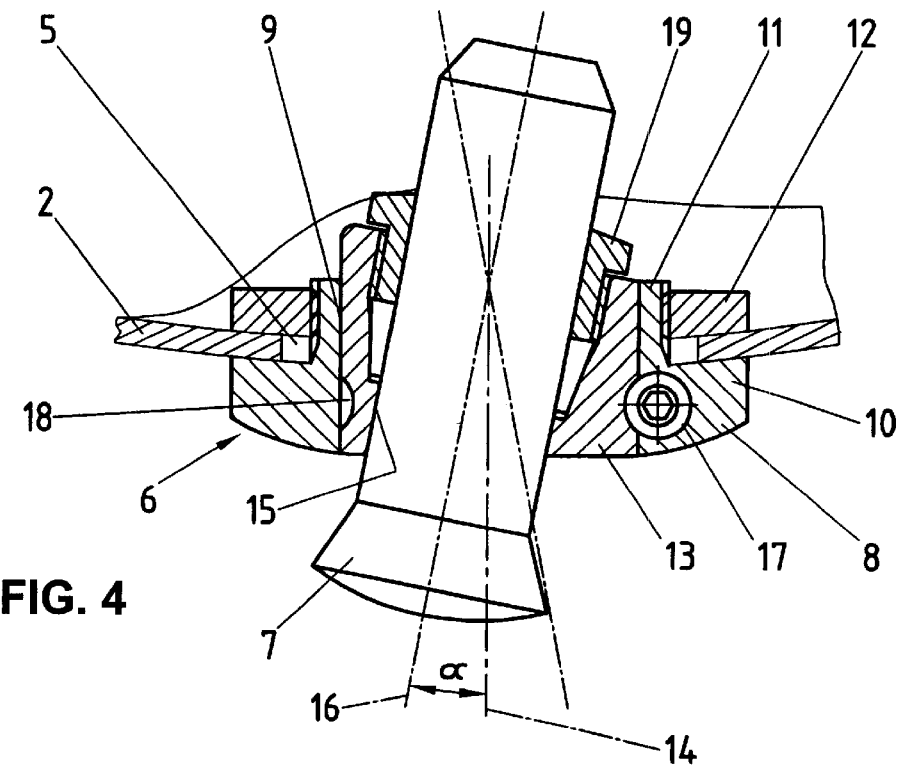
FIG. 4 is an enlarged view of the holding means embodiment shown on the right side of FIG. 1.

The embodiment for a holding means 6 according to FIG. 4, which is shown in FIG. 1 on the right side, has a rotation mechanism formed by a worm gear, made up of a screw 17 disposed in the first sleeve-shaped element, which screw meshes with a threading 18 provided on the circumference of the further sleeve-shaped element. Through rotation of the screw, the further sleeve-shaped element 13 can thus be rotated with respect to the first sleeve-shaped element 8 about the rotational axis 14. The axis 16, which coincides with the magnifying lens axis, describes a circle with the full rotation of the further sleeve-shaped element.

Provided on the inner end of the further sleeve-shaped element, in the embodiment according to FIG. 4, is a tightening screw 19 with which the magnifying lens 7 can be secured in the further sleeve-shaped element 13 in a known way against possible longitudinal displacement.

Figure 5:
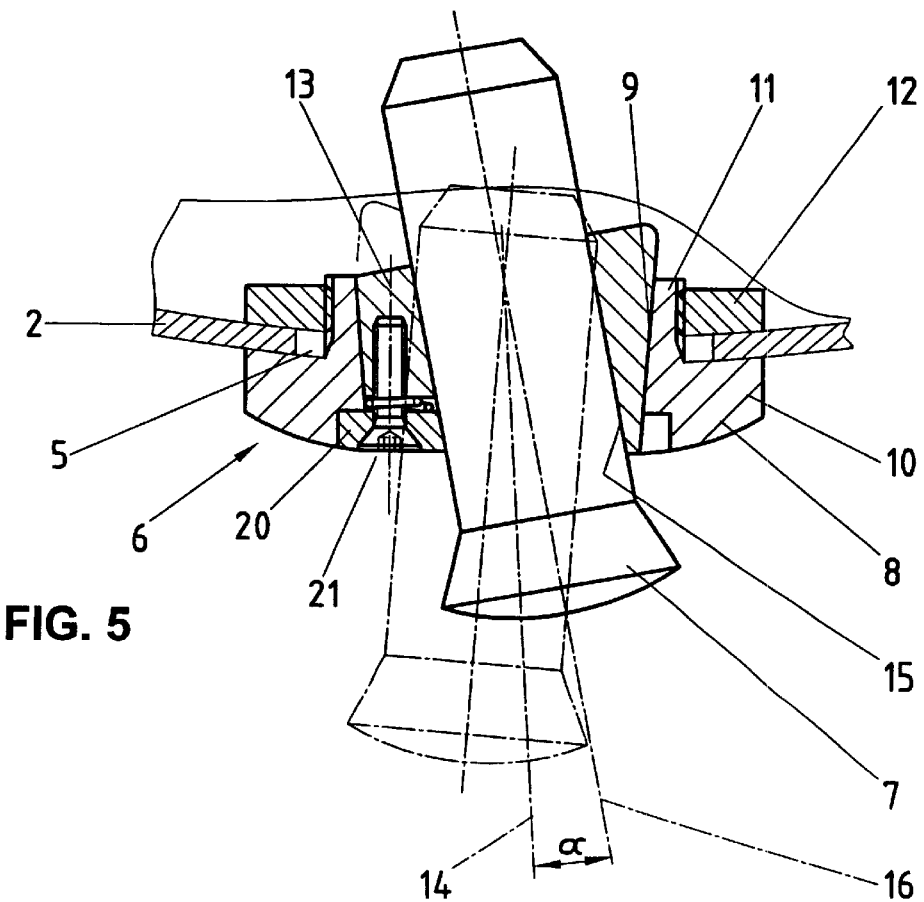
FIG. 5 is an enlarged view of the holding means embodiment shown on the left side in FIG. 1.

In a further embodiment of the holding means 6, as shown in FIG. 5 and which is disposed on the left side in FIG. 1, the bore 9 of the first sleeve-shaped element 8 has a tapered surface. The outer surface of the further sleeve-shaped element 13, which is inserted into this bore 9, is designed correspondingly. By means of a stop device, or small plate 20, which can be tensioned against the further sleeve-shaped element 13 by means of a screw, and which supports itself on the first sleeve-shaped element 8 and abuts the magnifying lens 7, the further sleeve-shaped element 13 can be pulled into the tapered bore 9 and clamped, the magnifying lens 7 being fixed at the same time. Therefore, in the tensioned state, the further sleeve-shaped element 13 cannot be rotated with respect to the first sleeve-shaped element 8. Also in this state the magnifying lens 7 can no longer be moved in longitudinal direction.

Although two different holding means 6, varying somewhat in structure, are shown for the magnifying lenses 7 in FIG. 1, it is of course common practice to use only one embodiment variant for the holding means 6 per pair of spectacles.

Figure 2:
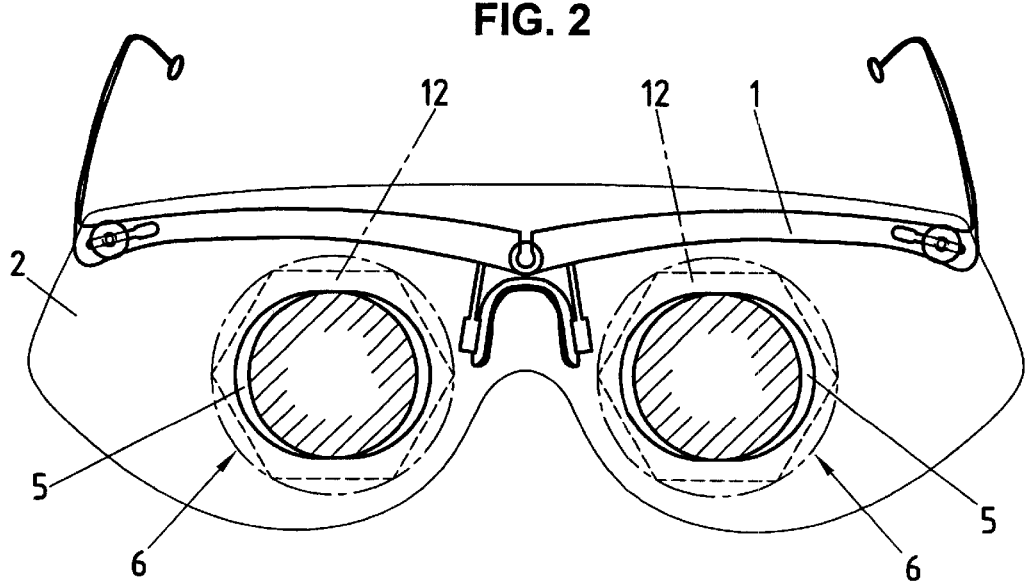
FIG. 2 shows a view of the spectacles according to claim 1 with slot-shaped apertures in the protective shield and holding means indicated schematically.

FIG. 2 shows a horizontal projection of the eyeglass frame 1 with the protective shield 2 placed thereon. As already mentioned, two slot-shaped apertures 5 are made in the protective shield. The longitudinal axis of the slot-shaped apertures 5 is hereby substantially parallel to the imaginary line of interpupillary spacing of a person wearing the spectacles. When the nut 12 is released, the holding means 6 for the magnifying lens 7 is thus movable in longitudinal direction in these slot-shaped apertures 5. The magnifying lenses 7 can thereby be brought into precise alignment with the pupil of the respective eye of the wearer of the spectacles, independently of how large the interpupillary spacing is of this eyeglass wearer. When this adjustment has been made, the nut 12 can be tightened; the holding means for the magnifying lenses 7 are then held clamped in the desired position and are thus fixed. If now the magnifying lenses 7 are adjusted to the interpupillary spacing, the further sleeve-shaped element 13 can be rotated in each case with respect to the first sleeve-shaped element 8 to the extent that the axes of the magnifying lenses intersect in the region with optimal depth of focus of the magnifying lenses. In the region of the point of intersection of the two magnifying lenses, the working area is visible, enlarged, with optimal sharp focus.

Figure 3:
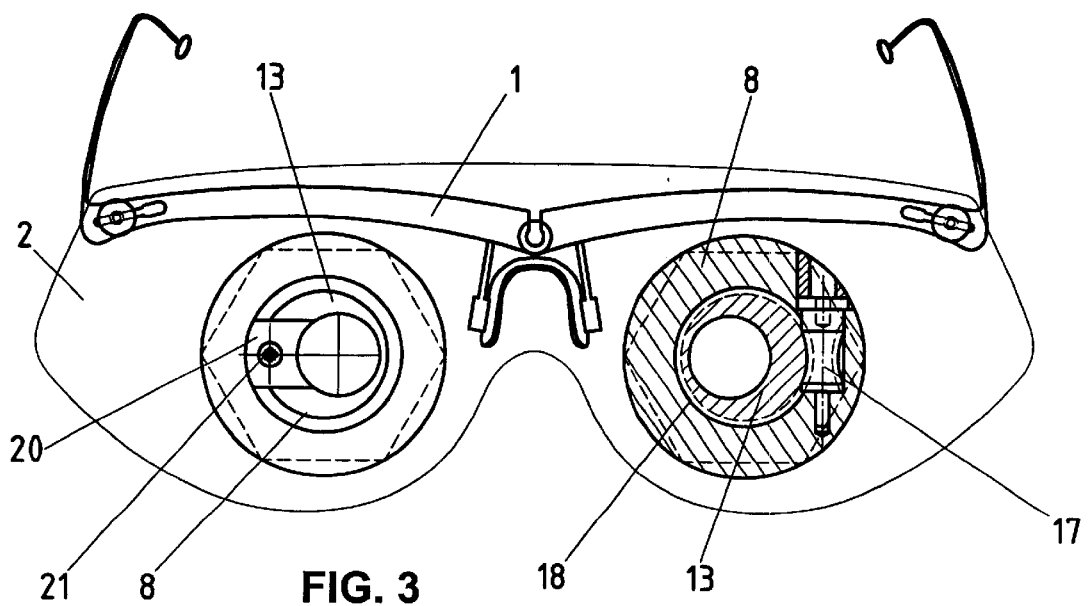
FIG. 3 is a view of the spectacles according to FIG. 1, the magnifying lens being omitted on the left side, whereas on the right side a section being shown along the line III—III according to FIG. 1, likewise with magnifying lens omitted.

FIG. 3 shows a horizontal projection of the spectacles as they are depicted in FIG. 1. On the left side is a view of the holding means 6 as it is indicated by arrow B in FIG. 1. In FIG. 3 the magnifying lens is not inserted. In particular the little plate 20 and the screw 21 are visible in this view, with which the further sleeve-shaped element 13 can be secured against rotation with respect to the first sleeve-shaped element 8.

Visible on the right side in FIG. 3 is a sectional view showing the holding means 6 depicted on the right side in FIG. 1. Particularly visible here is the screw 17 which is rotatably held in the first sleeve-shaped element 8, and which meshes with a threading 18 provided over the circumference of the further sleeve-shaped element 13, as has already been described in particular with reference to FIG. 4.

Figure 6:
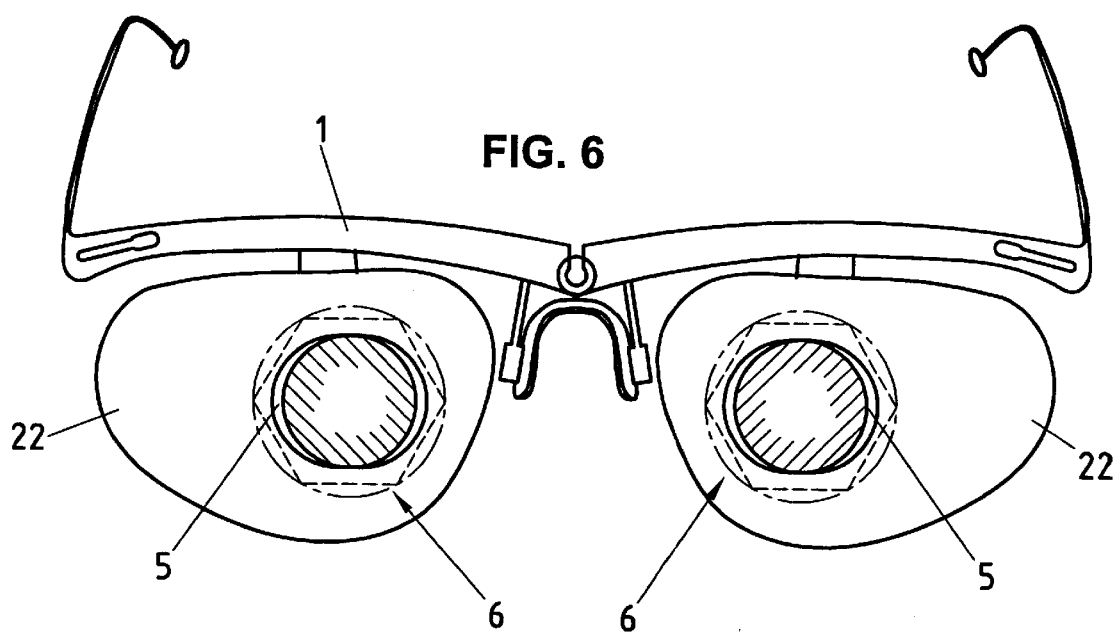
FIG. 6 is a view of spectacles in which the slot-shaped apertures are made in the eyeglass lenses inserted in the eyeglass frame.

In the embodiment described in the foregoing, each holding means with the magnifying lens is fixed in the protective shield that can be placed on an eyeglass frame. As shown in FIG. 6, the slot-shaped apertures 5 can also be provided in the eyeglass lenses 22, which eyeglass lenses 22 are fastened to the eyeglass frame 1. Then, as has already been described, the holding means 6 and the magnifying lenses inserted therein can be correspondingly inserted into these slot-shaped apertures 5 and adjusted. The eyeglass lenses 22 here can be non-corrective or non-prescription lenses. They can also be designed as corrective or prescription lenses, however, with the advantage that the surrounding field for the viewer can be perceived through these eyeglass lenses, ensuring optimal vision in the surrounding field as well.

Figure 7:
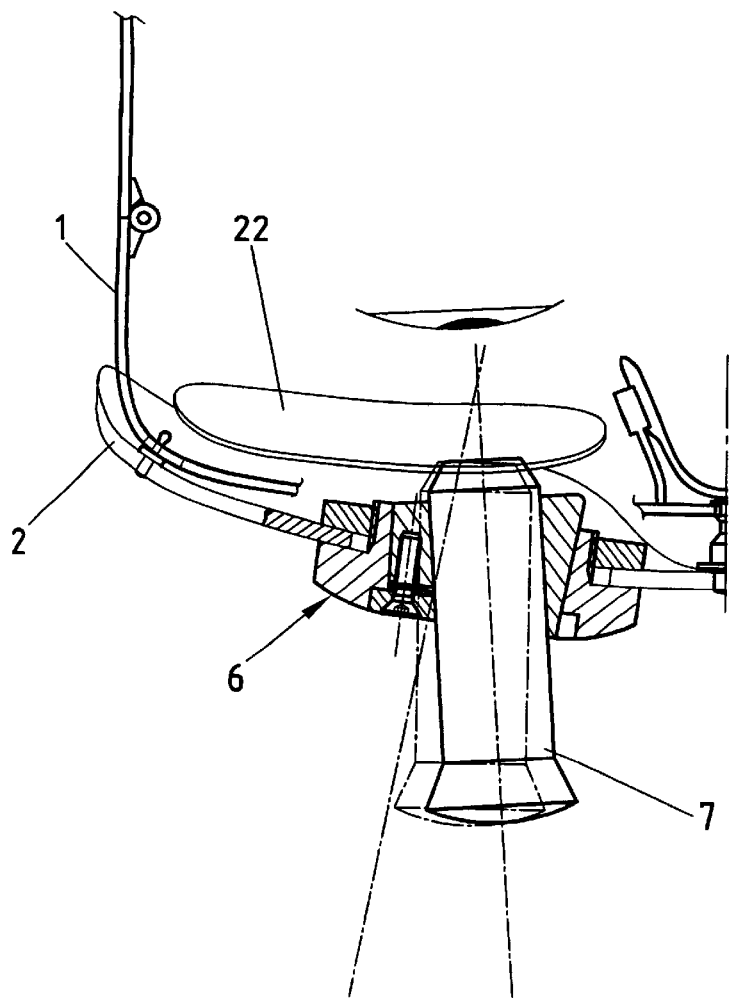
FIG. 7 is a view from above of spectacles with inserted eyeglass lenses and a placed-on protective shield, the magnifying lens being fixed in the protective shield.

As can be seen from FIG. 7, the protective shield 2, in which the magnifying lenses 7 are held in the way previously described, can also be placed upon an eyeglass frame 2 in which eyeglass lenses 22 have already been fixed. This has in particular the advantage that after removal of the protective shield 2 with the magnifying lenses 7 held therein, the eyeglass wearer is wearing a normal pair of eyeglasses provided with corrective or prescription lenses. Through the possibility of longitudinal displacement of the magnifying lenses 7, the magnifying lenses can be shifted such that they are situated on top of the eyeglass lenses 22. If just a protective shield 2 with the magnifying lenses contained therein, or just eyeglass lenses 22 with magnifying lenses 7 held correspondingly therein, are used, the magnifying lenses can be shifted into a position optimally spaced from the eye, through longitudinal displacement.

Ensured with these spectacles having magnifying lenses according to the invention is that the magnifying lenses can be adjusted optimally to the eyes of the eyeglass wearer, it being possible to obtain an optimal, unrestricted view of the surrounding field. Moreover the magnifying lenses can be exchanged in each case in a simple way. Considerable improvements over the known spectacles of this type are also achieved through the variety of possibilities for fixing the magnifying lenses on the eyeglass lenses or on a protective shield.

What is claimed is:

1. Spectacles, comprising an eyeglass frame in which at least one transparent element acting as a glass is insertable and which comprises at least one continuous slot-shaped aperture made in the transparent element, in which aperture a magnifying lens is able to be disposed in each case, which slot-shaped aperture has a longitudinal axis that is aligned substantially parallel to the imaginary line of spacing between the pupils of the eyeglass wearer, and in which slot-shaped aperture the magnifying lens is displaceable in longitudinal axial direction of this slot-shaped aperture, and wherein a clamping device is provided with which the magnifying lens can be held, clamped, in adjusted position in the slot-shaped aperture of the transparent element, in that the clamping device contains a first sleeve-shaped element provided with a continuous bore in which bore a further sleeve-shaped element is coaxially inserted, the further sleeve-shaped element being rotatable with respect to the first sleeve-shaped element about a rotational axis, and the further sleeve-shaped element has a further continuous bore the axis of which is inclined with respect to the rotational axis, and wherein the magnifying lens is inserted into this further continuous bore of the further sleeve-shaped element.

2. The spectacles of claim 1, wherein the clamping device is formed by a flange and a threaded part, whereby, in the state of being placed on the transparent element, the flange is supported on the one side of the transparent element, and the threaded part projects through the slot-shaped aperture, and in that the flange can be pressed against the transparent element by means of a nut which can be screwed onto the threaded part and is supported on the other side of the transparent element.

3. The spectacles of claim 1, wherein a rotation mechanism is provided for rotation of the further sleeve-shaped element, with the inserted magnifying lens, with respect to the first sleeve-shaped element.

4. The spectacles of claim 3, wherein a stop device is provided to stop the rotation of the further sleeve-shaped element with respect to the first sleeve-shaped element.

5. The spectacles of claim 1, wherein the magnifying lens is displaceable in the direction of its longitudinal axis with respect to the transparent element.

6. The spectacles of claim 1, wherein the transparent element comprises two eyeglass lenses mountable on the eyeglass frame, and each eyeglass lens is provided with a slot-shaped aperture for receiving in each case a magnifying lens.

7. The spectacles of claim 6, wherein the eyeglass lenses are prescription lenses.

8. The spectacles of claim 1, wherein the transparent element comprises a protective shield mountable on the eyeglass frame, and wherein the protective shield is provided with two slot-shaped apertures for receiving in each case a magnifying lens.

9. The spectacles of claim 8, wherein the protective shield, with the two magnifying lenses inserted therein, can be placed on an eyeglass frame on which two eyeglass lenses are mounted.

* * * * *